(12) United States Patent
Shi et al.

(10) Patent No.: US 11,275,675 B2
(45) Date of Patent: Mar. 15, 2022

(54) VALIDATION OF A SUBSET OF A PLURALITY OF RESPONSES DURING PROTOCOL TESTING

(71) Applicant: International Business Machines Corporation, Armonk, NY (US)

(72) Inventors: Peng Shi, Tucson, AZ (US); Louie A. Dickens, Tucson, AZ (US); Karl David Joseph Arvizu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 16/836,684

(22) Filed: Mar. 31, 2020

(65) Prior Publication Data

US 2021/0303452 A1 Sep. 30, 2021

(51) Int. Cl.
*G06F 11/00* (2006.01)
*G06F 11/36* (2006.01)

(52) U.S. Cl.
CPC ...... *G06F 11/3688* (2013.01); *G06F 11/3692* (2013.01)

(58) Field of Classification Search
CPC .......................... G06F 11/3688; G06F 11/3692
See application file for complete search history.

(56) References Cited

U.S. PATENT DOCUMENTS

| | | |
|---|---|---|
| 5,490,249 A | 2/1996 | Miller |
| 5,615,335 A | 3/1997 | Onffroy et al. |
| 5,659,555 A | 8/1997 | Lee et al. |
| 6,148,338 A | 11/2000 | Lachelt et al. |
| 6,560,723 B1 * | 5/2003 | Matsui ............ H04L 43/50 714/39 |
| 6,804,709 B2 | 10/2004 | Manjure et al. |
| 7,117,411 B2 | 10/2006 | McNeely et al. |
| 7,342,892 B2 | 3/2008 | Soon et al. |
| 7,418,492 B1 | 8/2008 | Cohen et al. |

(Continued)

FOREIGN PATENT DOCUMENTS

CN 100347993 C 11/2007

OTHER PUBLICATIONS

De et al., "VirtualWire: A Fault Injection and Analysis Tool for Network Protocols," Proceedings of the 23rd International Conference on Distributed Computing Systems, 2003, 8 pages.

(Continued)

*Primary Examiner* — Jonathan D Gibson
(74) *Attorney, Agent, or Firm* — Zilka-Kotab, P.C.

(57) ABSTRACT

A computer-implemented method according to one embodiment includes receiving, by a protocol server, a source code file. The source code file includes a TCDF. The TCDF includes parameters for a test case, preparation steps related to the test case, and a plurality of test case blocks. Each test case block of the plurality of test case blocks includes a set of testing steps and a certificate. The source code file is output by the protocol server to a SUT with an instruction for the SUT to execute the source code file in order to implement the set of testing steps for each of the plurality of test case blocks. A plurality of responses are received by the protocol server from the SUT. Each of the responses are compared against the certificates of the test case blocks. A test result is generated by the protocol server based on the comparisons.

20 Claims, 12 Drawing Sheets

(56) References Cited

U.S. PATENT DOCUMENTS

| | | | |
|---|---|---|---|
| 7,661,034 B2* | 2/2010 | Johnson | H04L 43/50 |
| | | | 714/43 |
| 7,958,230 B2* | 6/2011 | Guruswamy | H04L 63/0823 |
| | | | 709/224 |
| 8,055,807 B2 | 11/2011 | Casper et al. | |
| 9,477,576 B2* | 10/2016 | Granshaw | G06F 11/3624 |
| 10,169,127 B2* | 1/2019 | Anderson | G06F 9/451 |
| 2008/0126867 A1* | 5/2008 | Pandarinathan | G06F 11/3688 |
| | | | 714/37 |
| 2009/0210571 A1 | 8/2009 | Casper et al. | |
| 2009/0210573 A1 | 8/2009 | Yudenfriend et al. | |
| 2009/0210884 A1 | 8/2009 | Ricci et al. | |
| 2017/0153971 A1* | 6/2017 | Fan | G06F 11/3692 |
| 2020/0201746 A1* | 6/2020 | Nishiwaki | G06F 11/3676 |
| 2020/0242015 A1* | 7/2020 | Catt | G06F 11/3684 |
| 2020/0387387 A1* | 12/2020 | Iijima | G06F 9/451 |
| 2021/0240604 A1* | 8/2021 | Pande | G06F 11/3664 |

OTHER PUBLICATIONS

Wang et al., "Transparent Network Protocol Testing and Evaluation," IEEE, 2013, pp. 1-8, retrieved from https://ieeexplore.ieee.org/document/6614205.

Marroquin et al., "Testing Communication Protocols within Test Cases Dependencies Framework," 12th International Conference Applied Computing, 2015, pp. 80-88.

* cited by examiner

```
"ParameterSet":
{                              600
  "Parameter-1": "<value>",    // Following JSON standard, each entry can be pair of
                               //name and simple data type(string, number) or composited
                               //data type, like list or another level of dictionary/map,
                               //meaning that the notation "<value>" can be simple
  "Parameter-2": "<value>",    //data type(string, number), list or dictionary/map
  "Parameter-3": "<value>",
  ...
  "Parameter-n": "<value>"
}
```

{
  "TestCaseGeneralInformation": {
    "TestCaseName": "tc-1",    // The test case is named as tc-1 in the example.
    "Version": "<value>",
    "TestDescription": "<value>",
    "SUTVersion": "<value>",
    ...
  },
  "TheTestCaseObject": {
    "TestCaseType": "<value>",
  },
  "AffiliatedTestBlocks" : [
    "TestCaseBlock-1",
    "TestCaseBlock-2",
    "TestCaseBlock-3",
    ......
    "TestCaseBlock-n"
  ],
  "TestCaseBlock-1": {    // Defines independent test block,
  "TestCaseBlock-2",      //which can be verified independently.
  "TestCaseBlock-3",
  ......
  "TestCaseBlock-n"
]
```

FIG. 7A

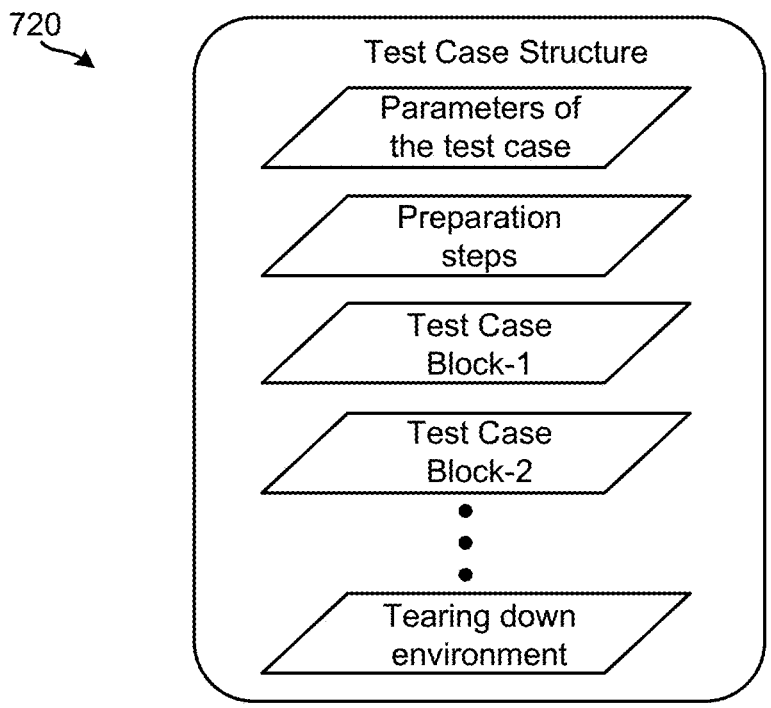

"TestCaseBlock-1": {   // Defines independent test block,
                       //which can be verified independently.

"parameter-A-for-funciton-FA": "<value>",  // setting one parameter(A) for function
"parameter-B-for-function-FB": "<value>"   //FA residing on protocol server
                    ↖                      // setting one parameter (named as b,
                    802                    //defined by the embedded json data)
...
"parameter-N-for-function-FX": "<value>", "BackgroundCommandsToRun": [
    "TestUnitReady",
    "ModeSense",
    "ModeSelect",
    "Read",              ←─ 804
    ...
    "Write",
    "Read",
    "Write"
],

FIG. 8A

```
"TheErrorInjection": [
  {
    "name": "Error-Injection-1",          ← 902

"Type": "<value>",                    ← 904

"TargetErrorInjectionCommand":
    {
      "name": "<value>"                   ← 906
    },
      "Parameters": {                     ← 908
        "parameter-1": "<value>",
        "parameter-2": "<value>",
        ...
        "parameter-3": "<value>"
      }
    },
    {
    "name": "Error-Injection-2"
    //Other parameters can defined
  } //similarly to "Error-Injection-1"

]
```

```
"TheCertificate" : [
  {
    "target": "Error-Injection-1",              ← 1002
    "type": "Single",
    "addressableUnits": [                        ← 1004
      {
        "type": "response",                      ← 1006
        "validations": [
          {
            "property": "status",                ← 1008
            "action": [
              {
                "op": "<value>",                 ← 1010
                "value": "<value>"               ← 1012
              },
              {}, ...{}
            ]                                    ← 1014
          },
```

FIG. 10A

```
                                                              ← 1000
      {
        "type": "responses",
        "validations": [
          {
            "property": ...,
            {
              "property": "<value>",
              "action": [
                {
                  "op": "<value>",
                  "value": "<value>"
                },
                {
                  "before": "total",             ← 1016
                  "action": [
                    {
                      "op": "<value>",           ← 1018
                      "value": "<value>"         ← 1020
                    },
                    {}, ...{}
                  ]                              ← 1022
                }
              ]
            }
          }
        ]
      }
```

FIG. 10B

```
1000
                            "target": "Error-Injection-2",
                            "type": "Single",       ← 1024
                          },
                          {
                            "target": {
                              "selector": {    ← 1026
                                "name": "",
                                "filters":   ← 1028
                                [
                                  [
                                    {
                                      "property": "<value>",  ← 1030
                                      "action":
                                      {
                                        "op": "<value>",   ← 1032
                                        "value": "<value>"  ← 1034
                                      }
                                    },
                                    {} ← 1036
                                  ],
                                  [],
                                  ...  ← 1038
                                  []
                                ], "timeWindow":
                                {
                                  "start": "Error-Injection-1.request",  ← 1040
                                  "end": "Error-Injection-2.response",   ← 1042
                                }
                              }
                            },
                            "type": "Group",   ← 1044
                            "addressableUnits": []  ← 1046
                          }
                        ]
                      },
                      "TestCaseBlock-2": {},
                      "TestCaseBlock-3": {},
                      ...
                      "TestCaseBlock-n": {}
                    }
```

FIG. 10C

VALIDATION OF A SUBSET OF A PLURALITY OF RESPONSES DURING PROTOCOL TESTING

BACKGROUND

The present invention relates to validation testing, and more specifically, this invention relates to communication protocol testing.

Storage protocol conformance testing is utilized for verifying an operation of a storage interface to an industry standard. There are many different storage protocols, e.g., Fibre Channel, Serial Attached Small Computer Systems Interface (SCSI), Internet Small Computer Systems Interface (iSCSI), etc., and historically, different test systems, e.g., hardware drivers, device drivers, etc., have been used to test the different storage protocols.

Communication protocol tests utilize processing potential based on validation points scattered across a predefined data structure. A degree of processing potential utilized during such testing may depend, at least in part, on the number of validation points, e.g., which can easily reach twenty or more in some protocols such as fibre channel protocol (FCP).

SUMMARY

A computer-implemented method according to one embodiment includes receiving, by a protocol server, a source code file. The source code file includes a test case definition file (TCDF). The TCDF includes parameters for a test case, preparation steps related to the test case, and a plurality of test case blocks. Each test case block of the plurality of test case blocks includes a set of testing steps and a certificate defining a validity of potential responses of performing the test steps. The source code file is output by the protocol server to a system under test (SUT) with an instruction for the SUT to execute the source code file in order to implement the set of testing steps for each of the plurality of test case blocks. A plurality of responses are received by the protocol server from the SUT. Each of the responses are compared by the protocol server against the certificates of the test case blocks. A test result is generated by the protocol server based on the comparisons.

A computer program product according to another embodiment includes a computer readable storage medium having program instructions embodied therewith. The program instructions are readable and/or executable by a protocol server to cause the protocol server to perform the foregoing method.

A system according to another embodiment includes a processor, and logic integrated with the processor, executable by the processor, or integrated with and executable by the processor. The logic is configured to cause a protocol server to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6 is a sample of pseudocode, in accordance with one embodiment.

FIG. 7A is a sample of pseudocode, in accordance with one embodiment.

FIG. 7B is a test case structure that corresponds to the sample of pseudocode of FIG. 7A.

FIG. 8A is a sample of pseudocode, in accordance with one embodiment.

FIG. 10A is a first portion of a sample of pseudocode, in accordance with one embodiment.

FIG. 10B is a second portion of the sample of pseudocode of FIG. 10A.

FIG. 10C is a third portion of the sample of pseudocode of FIGS. 10A-10B.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for validating a subset of a plurality of responses during protocol testing.

In one general embodiment, a computer-implemented method includes receiving, by a protocol server, a source code file. The source code file includes a test case definition file (TCDF), and the TCDF includes parameters for a test case, preparation steps related to the test case, and a plurality of test case blocks. Each test case block of the plurality of test case blocks includes a set of testing steps and a certificate defining a validity of potential responses of performing the test steps. The source code file is output by the protocol server to a system under test (SUT) with an instruction for the SUT to execute the source code file in order to implement the set of testing steps for each of the plurality of test case blocks. A plurality of responses are received by the protocol server from the SUT. Each of the responses are compared by the protocol server against the certificates of the test case blocks. A test result is generated by the protocol server based on the comparisons.

In another general embodiment, a computer program product includes a computer readable storage medium having program instructions embodied therewith. The program instructions are readable and/or executable by a protocol server to cause the protocol server to perform the foregoing method.

In another general embodiment, a system includes a processor, and logic integrated with the processor, executable by the processor, or integrated with and executable by the processor. The logic is configured to cause a protocol server to perform the foregoing method.

Figure 1:
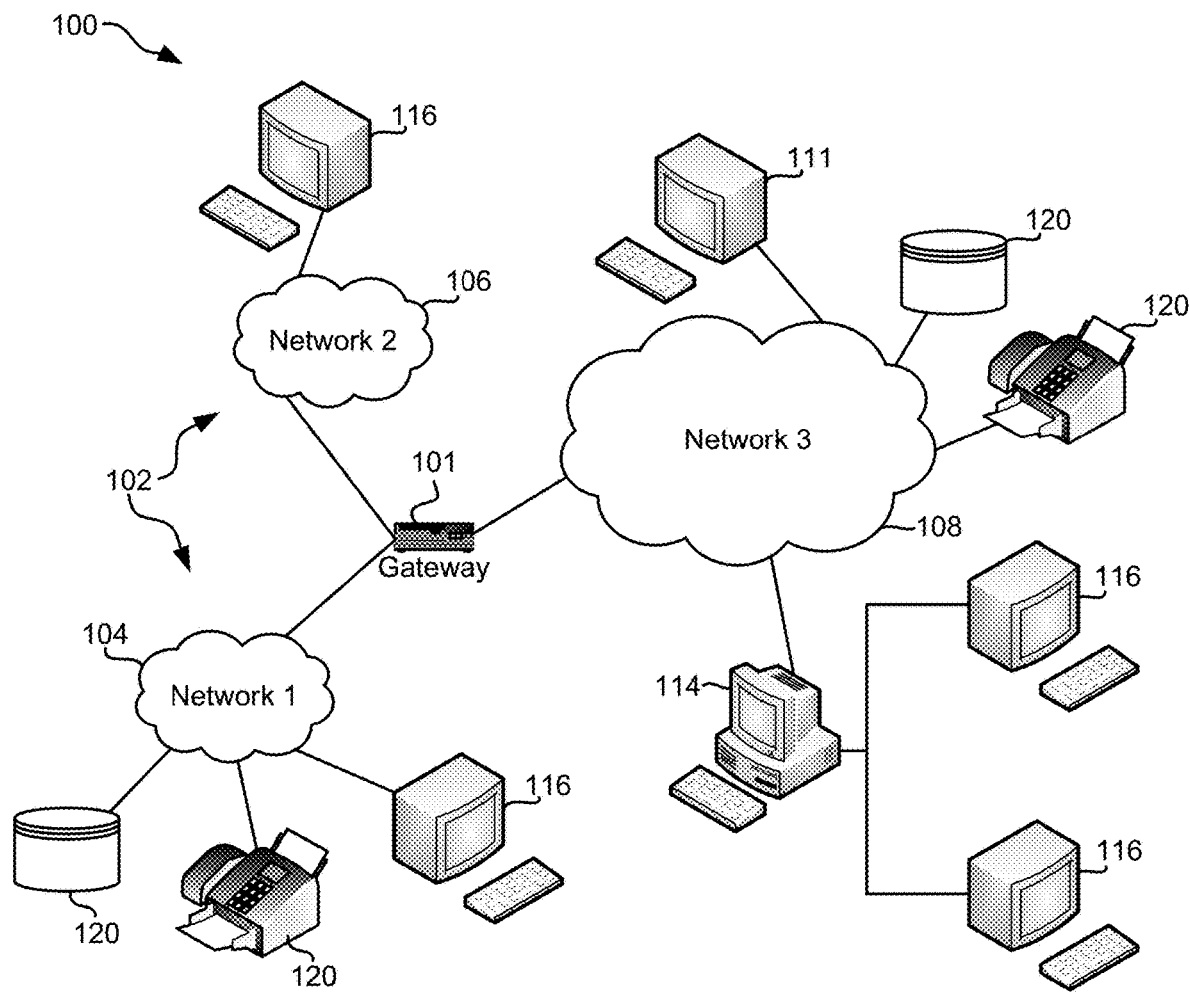
FIG. 1 is a diagram of a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
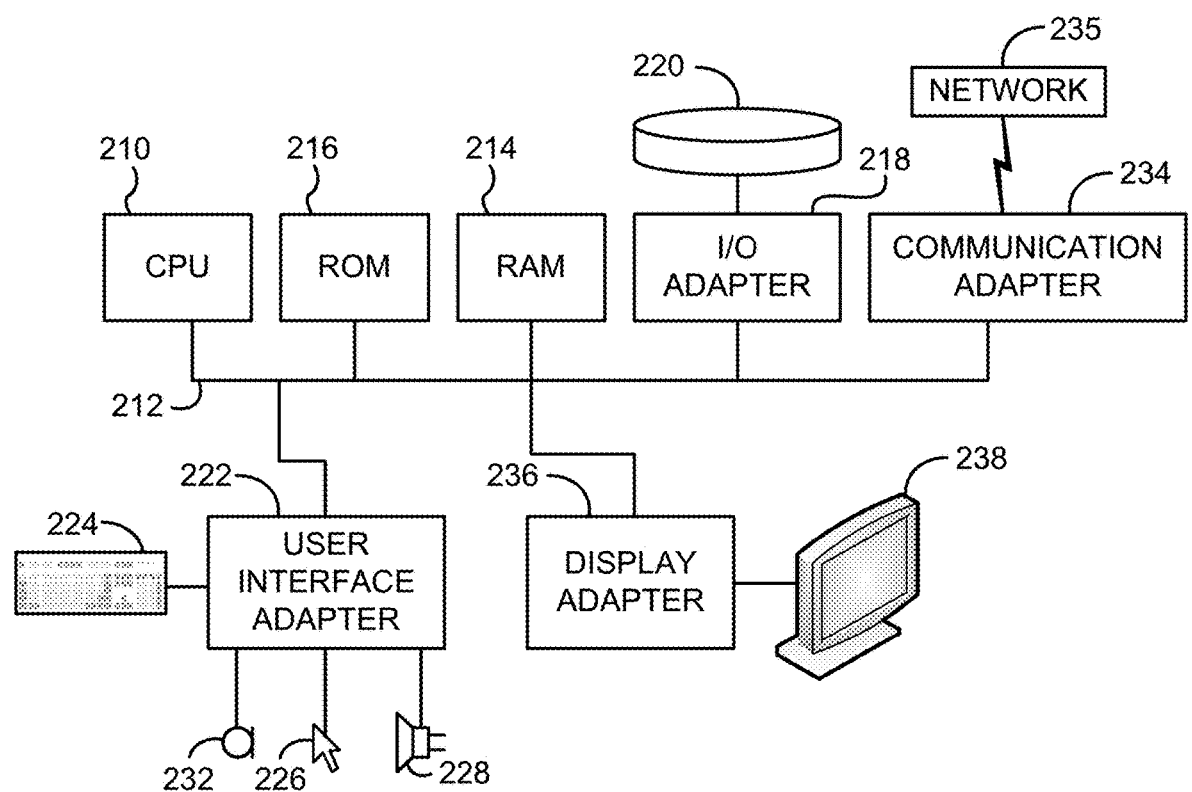
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
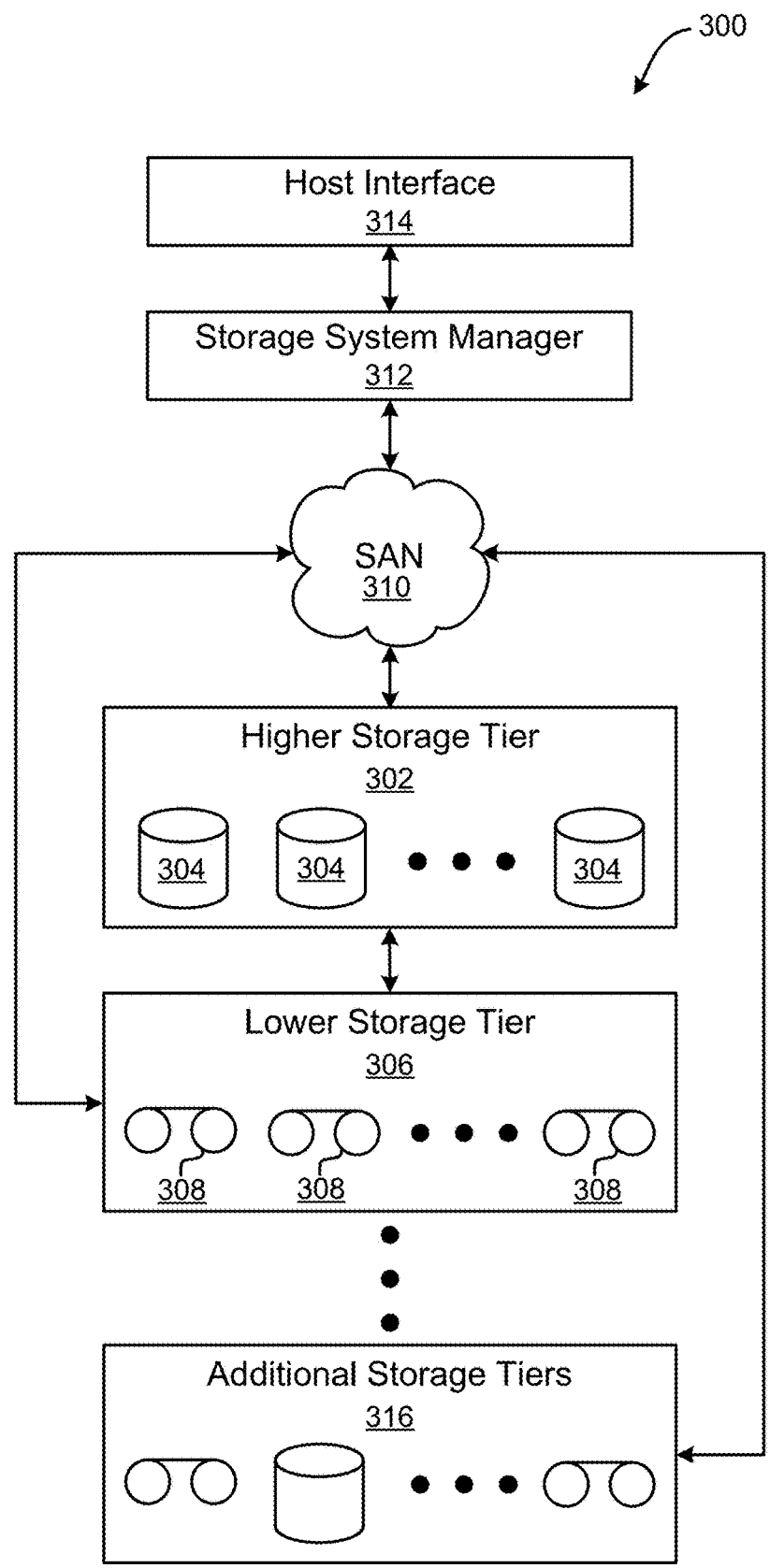
FIG. 3 is a diagram of a tiered data storage system, in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere above, storage protocol conformance testing is utilized for verifying an operation of a storage interface to an industry standard. There are many different storage protocols, e.g., Fibre Channel, SCSI, iSCSI, etc., and historically, different test systems, e.g., hardware drivers, device drivers, etc., have been used to test the different storage protocols.

Communication protocol tests utilize processing potential based on validation points scattered across a predefined data structure. A degree of processing potential utilized during such testing may depend, at least in part, on the number of validation points, e.g., which can easily reach twenty or more in some protocols such as FCP. In view of this, a distributed framework is sometimes implemented and used in some environments. In the distributed framework, the test client and protocol server are implemented separately and run separately during testing, thereby presenting relatively improved separation in both development and test execution. The effectiveness of testing within a distributed framework may closely depend on a degree of success that the test client is capable of controlling and/or directing a protocol test server to run each test step and verify the defined validation certificates.

Various embodiments and approaches described herein include techniques for establishing relatively increased levels of control over a protocol server by a test client so that relatively complex scenarios, e.g., such as a status and/or state of a machine of a SUT may be tested.

Figure 4:
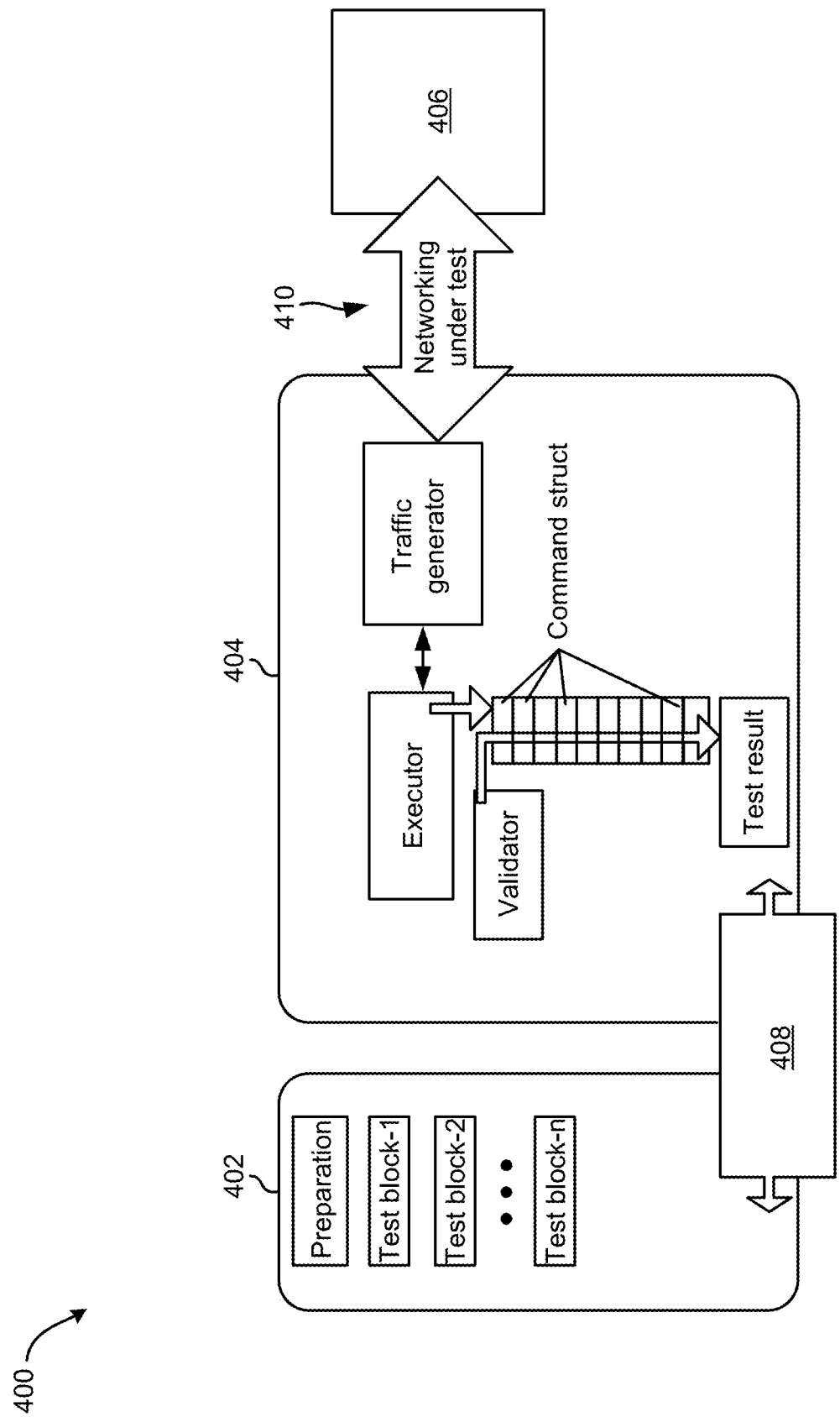
FIG. 4 is an overview representation of a system architecture, in accordance with one embodiment.

FIG. 4 depicts a system architecture 400 for initiating testing of a SUT and verifying testing results thereafter, in accordance with one embodiment. As an option, the present system architecture 400 may be implemented in conjunction with features from any other embodiment listed herein, such as those described with reference to the other FIGS. Of course, however, such system architecture 400 and others presented herein may be used in various applications and/or in permutations which may or may not be specifically described in the illustrative embodiments listed herein. Further, the system architecture 400 presented herein may be used in any desired environment.

System architecture 400 illustrates an illustrative embodiment in which a TCDF is used to test at least one SUT, e.g., see SUT 406. System architecture 400 includes a test client application 402. The test client application 402 may be in communication with a protocol server application of a protocol server 404 using a known type of communication framework 408. Depending on the approach, the test client application 402 may include a plurality of defined test case blocks, e.g., see Test block-1, Test block-2, Test block-n, which may be included in a TCDF generated by the test client application 402. The test client application 402 may additionally and/or alternatively include a preparation block, e.g., see Preparation, which may be configured to generate preambles for preparing a context on a known type of SUT 406, before error injection is triggered.

The protocol server 404 may include an executor which may be in communication with a traffic generator, e.g. see Executor and Traffic generator. Moreover, the protocol server application of the protocol server 404 may be in communication with the SUT 406 using a known type of communication framework 410, e.g., using the traffic generator. In some approaches, responses of the SUT 406 to commands issued by the executor may be routed back to the executor by the traffic generator for validation by a validator of the protocol server 404, e.g., see Validator. Such validation may be performed using a command struct, e.g., see Command struct. Thereafter, test results may be generated on the protocol server 404, e.g., see Test results.

Figure 5:
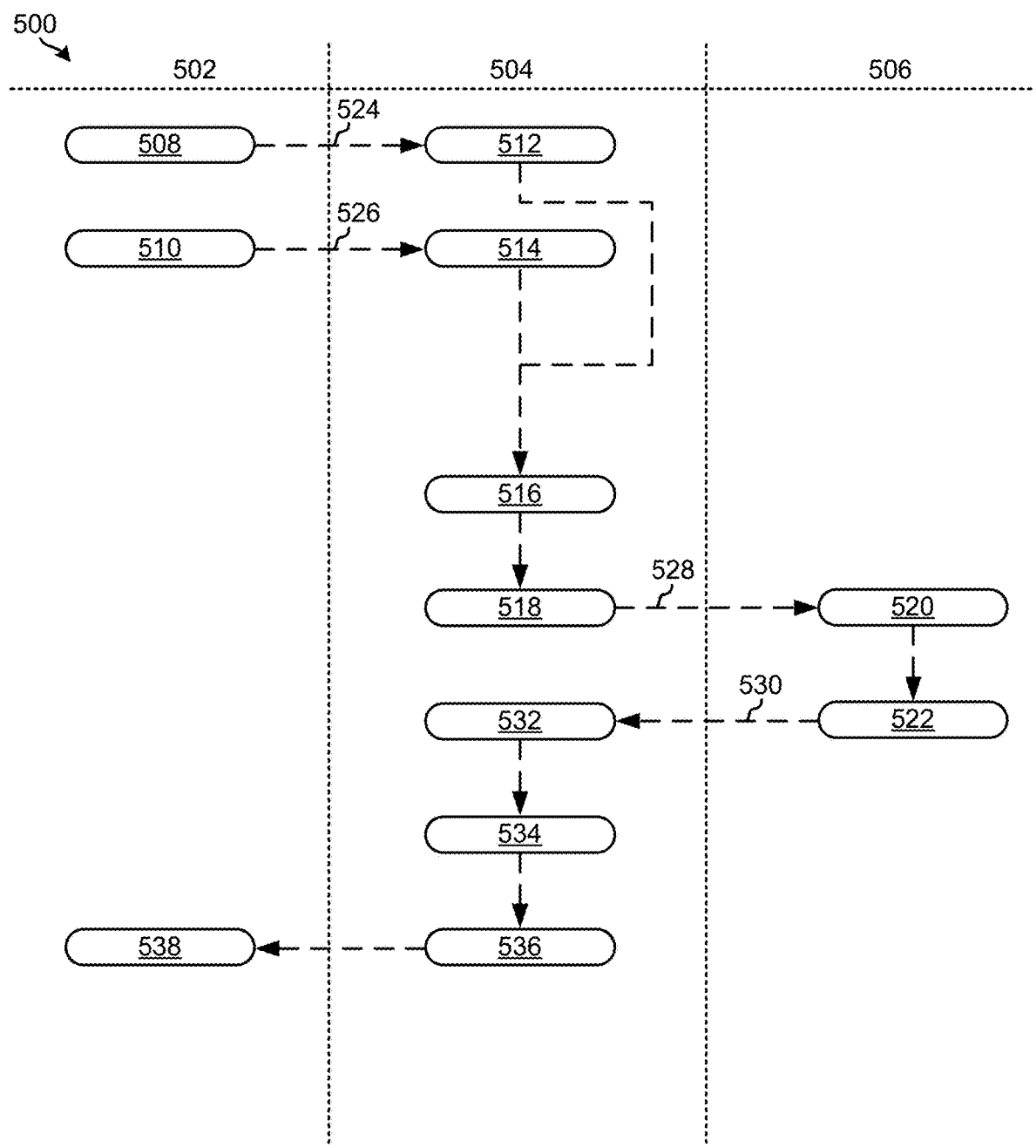
FIG. 5 is a flowchart of a method, in accordance with one embodiment.

Now referring to FIG. 5, a flowchart of a method 500 is shown according to one embodiment. The method 500 may be performed in accordance with the present invention in any of the environments depicted in FIGS. 1-4 and 6-13B, among others, in various embodiments. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, each of the nodes 502, 504, 506 shown in the flowchart of method 500 may correspond to a test client application, a protocol server and a SUT (respectively) positioned within a data storage environment. Moreover, each of the one or more nodes are preferably configured to communicate with each other.

In various embodiments, the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that some conventional system testing protocols present one framework of distributed protocol testing, with a test client directing protocol server to drive different testing steps. However, such testing does not address testing of relatively complex scenarios such as, e.g., group behavior, time constraints flow control factors, etc. Protocol testing includes more types of verification than just simple field validation. For example, in transaction-oriented services or applications, e.g., commands executed by a target SUT are not independent, a portion of the protocol standards define the states of services and how received commands will be handled according to the state of service therein. In this distributed protocol testing framework, test clients and protocol servers are separate applications, however both of them interact with each other to meet a testing purpose, e.g., determining which function holds protocol standard conformance (a case regarded as "pass") and which function does not hold protocol standard conformance (a case regarded as "fail").

Various embodiments and approaches described herein, e.g., such as method 500, may include protocol testing which can be utilized in an independent module and/or implemented in a system, through which a test client may direct a protocol server to perform comprehensive testing scenarios. Such embodiments and/or approaches may be based on a designed interface message format which thereby conveys an amount of information that enables a protocol server to run test steps of a test client, and verify one or more validation points to certify a test result of the function(s).

With continued reference to method 500, operation 508 includes preparing a source code file for sending to the node 504. As will be described elsewhere below, the source code file preferably includes a TCDF which may be used to initiate testing on a SUT, e.g., node 506.

In some approaches, preparing the source code file may include the node 502 defining the TCDF. The TCDF may, depending on the approach, be defined in any one or more known language formats, e.g., JavaScript Object Notation (JSON), eXtensible Markup Language (XML), YAML Ain't Markup Language (YAML), etc. Various embodiments and approaches described elsewhere herein are described with respect to JSON for purposes of illustrative examples without losing generality, e.g., see FIGS. 6-10C.

Following JSON standard, in some approaches, each entry of the TCDF may include a pair of a name and a simple data type, e.g., a string, a number, etc. In some other approaches, each entry of the TCDF may additionally and/or alternatively include a composited data type, e.g., such as a list, another level of dictionary, a map, etc. For example, in one approach, the notation "<value>" of a parameter set may be, e.g., a simple data type (string, number), a list, a dictionary, etc. (see FIG. 6). Note that the terms "dictionary" and "map" may be used interchangeably herein unless noted otherwise. In some approaches, pairs of names and values included in the TCDF may be consumed by both the node 502 and the node 504.

In some approaches a parameter set may be defined by one or more of the name and data type pairings mentioned above. The parameter set may in some approaches be used to define each functional block in the TCDF, e.g., see FIG. 6.

The source code may additionally and/or alternatively include one or more test case blocks defined therein, e.g., which in one approach may be defined on the TCDF by the node 502. For context, in some approaches, a test case block is a group of testing steps. The test case block may be execution independent and/or validation independent from any one or more other test case blocks. Moreover, the information, e.g., variables, real time parameters, etc., may be transferred between different test case blocks during execution to facilitate testing purposes. A sample of pseudocode for defining a test case block will be described elsewhere herein for purposes of a non-limiting example, e.g., see FIG. 8A.

According to another approach, the source code file may additionally and/or alternatively include error injection information defined therein, e.g., which in one approach may be defined on the TCDF by the node 502. The error injection information may include more than one error injection steps. In one approach, the error injection steps may be defined as an anonymous dictionary and/or map included in a list. In other approach the error injection steps may be defined as a named entry in a dictionary and/or map.

As will be described elsewhere herein, error injection may be initiated on a system under test, e.g., node 506, by a protocol server, e.g., node 504, in order to perform validation of responses received thereafter from the system under test. A sample of pseudocode for defining error injection will be described elsewhere herein for purposes of a non-limiting example, e.g., see FIG. 9.

According to one approach, preparing the source code file may include the node 502 preparing directives that may be utilized by the node 504 for running one or more known types of preambles in order to prepare a known type of context before error injection is triggered. For context, directives may be a set of data structures which are exchanged between a test client such as node 502 and a protocol server such as node 504. The context may prepare the node 504 and/or the node 506 for an initiated error injection. During the error injection, source code specified in the TCDF may be used by the node 504 to initiate one or more commands to be performed on the node 506. Thereafter results returned from the node 506 to the node 504 may be verified.

In some approaches, directives may be included in the source code file sent to the node 504. In some other approaches, the directives may be independently generated, e.g., see operation 510, and sent to the node 504 of method 500 independently from the source code file, e.g., see operation 524 and operation 526. The node 502 may send the directives to the node 504 to configure functions residing on the node 504 in order to ensure that such functions are configured as predetermined instances and thereby operate accordingly. In other approaches, the node 502 may send directives within one or more of the testing blocks to configure functions residing on the protocol server.

According to some non-limiting approaches, the directives may be defined in one or more known types of languages mutually understandable by a test client and a protocol server, e.g., Common Object Request Broker Architecture language by COBRA, Interface define language (IDL), Thrift Language by APACHE, Protocol Buffer Language by GOOGLE, etc. The interface definition language in some approaches depends on a known type of underlying communication framework that may be configured between node 502 and the node 504. The directives are in some preferred approaches preferably used to drive all the testing operations (described elsewhere below) that are performed by the node 504.

The directives may in some approaches be embedded and/or compiled by the node 502. This may ensure that internal directives that are exchanged between the node 502 and the node 504 are configured in a data format that is supported by the underlying communication framework. In one approach, the underlying communication framework may be implemented through a remote procedure call (RPC) framework, e.g., such as CORBA, Apache Thrift, or Protocol Buffers, etc. According to another approach, directives and/or commands may be sent and/or responses may be received via one or more different known types of service implementation, e.g., such as a web service, a message service built on top of a communication protocols (such as HyperText Transfer Protocol (HTTP), Transmission Control Protocol (TCP)), etc.

The source code preferably includes one or more certificates. One or more of such certificates may be defined by the node 502 and included in the TCDF of the source code. For context, as will be described elsewhere below, a certificate may define a validation point, or point to check, e.g., such as a point of a system under test. For example, a simple certificate may in one approach be defined as checking whether the value of a selected field is equal to an expected value that is specified. In another example, a certificate may be defined as a group of checks upon various selected fields of data structures under test. As will be described in various approaches elsewhere below, e.g., see operation 534, such certificates are preferably configured to filter results returned from a system under test to thereby define a subset of responses for verifying. Accordingly, verification of responses of a system under test may be narrowed to specific subgroups of responses, which is not otherwise available in conventional approaches.

A certificate may in some approaches be defined as an anonymous dictionary and/or map included in a list, e.g., a list defined in the TCDF. In some other approaches, a certificate may be defined as a named entry in a dictionary and/or map, e.g., which may be included in the TCDF.

A certificate may be defined against any known type of element under testing, e.g., a command, a request frame of a command, a response frame of a command, identifiable elements (addressable), etc. For example, in some approaches, a certificate may be defined for verifying a single testing element, e.g., such as a command configured to be used in a simple value verification operation.

According to some other approaches, a certificate may be defined for verifying a group of testing elements. In one or more of such approaches, the certificate may be defined by a selector that further defines filters for establishing a subset of a plurality of responses received responses for verifying.

With continued reference to method 500, operation 512 includes receiving, by the node 504, the source code file. Operation 514 of method 500 includes receiving, by the node 504, the directives. Note that the directives and the source code file are received by the node 504 in independent operations in the current approach, although in another approach they may be received in a common operation.

The received source code file according to one preferred approach includes the TCDF. Moreover, in one approach the TCDF preferably includes parameters for a test case, preparation steps related to the test case and a plurality of test case blocks. Note however that depending on the approach, one or more other types of information and/or any combination thereof may be included in the source code file.

Each test case block of the plurality of test case blocks may in some approaches include a set of testing steps. Moreover, each test case block of the plurality of test case blocks may additionally and/or alternatively include a certificate defining a validity of potential responses of performing the test steps. For example, in some approaches illustrative validity of potential responses includes, e.g., a successful or unsuccessful response to the set of testing steps.

Directives may in some approaches be embedded and/or compiled into software of the node 504 such as protocol server software of a protocol server, e.g., see operation 516. During such embedding and/or compiling each directive may be translated into a specific functionality or a group of functionalities. One functionality or a group of functionalities may thereafter interact with a SUT, e.g., the node 506, to test a specific function spec provided by the SUT. In one preferred approach, interaction between a protocol server and a SUT occurs on top of a network under test between the node 504 and the node 506. For context, various non-limiting examples of such a networking under test may include, e.g., a fibre channel, an Ethernet, a known type of networking technology which may be used to implement network-based services/functions, etc.

In some approaches, the received source file code may have one or more test blocks defined therein. In one or more of such approaches, the test blocks may be run according to an ordering specified in a definition of the TCDF, e.g., see operation 518 of method 500. Each test block may interact with an executor of the node 504 such that all configurations are configured in a running context, and such that all the commands, e.g., including defined error injections steps, are executed.

In some approaches, a list of command structs may be constructed according to a list of the commands of the TCDF, e.g., such as specified background commands for running. In one approach, the list of command structs may be constructed in response to a determination that the executor of the node 504 has received a test block from the node 502. The method may in some approaches include preparing and associating error injection to a target command selected from the list of the commands of the TCDF upon the executor receiving the test block.

Operation 528 includes outputting, by the node 504 to the node 506, the source code file with an instruction for the node 506 to execute the source code file in order to implement the set of testing steps for each of the plurality of test case blocks. More specifically, in some approaches, a subportion of the source code file may be output by the node 504 during operation 528. For example, in one approach, operation 528 includes outputting commands of the TCDF to the node 506. In another approach, operation 528 includes communicating certificates defined for the active test block to the node 506. In such an approach, communicating such certificates may enable the node 506 to construct a data structure that is thereafter applied by the validator of the node 504.

The node 504 may utilize a known type of traffic generator for driving information such as the commands of the TCDF to the node 506. The traffic generator may in some approaches further encapsulate commands one by one with a transport layer protocol under test and send a final frame to a wire connected to the node 506.

Outputs of the node 504 are received by the node 506 in operation 520 of method 500.

In some approaches, subsequent to receiving the command frames from the node 504, the node 506 may send back responses produced according to the functional spec of the node 506. In some approaches such responses may be generated by the node 506. For example, subsequent to receiving such outputs, the node 506 may execute at least a portion of the source code file, e.g., see operation 522, and thereby generate a plurality of responses that correspond to commands performed during implementation of the source code file. Because the node 506 is preferably a system under test, the plurality of responses are preferably verified, e.g., by the node 504. Accordingly, the plurality of responses are output from the node 506 to the node 504, e.g., see operation 530.

Operation 532 includes receiving, by the node 504 from the node 506, the plurality of responses. In some approaches the received responses may include all of the responses generated by the node 506 as a result of performing the instructions of the node 504. In another approach, the received responses may include a subset of the responses generated by the node 506 as a result of performing the instructions of the node 504. For example, in one approach, operation 532 may include the node 504 receiving multiple subsets of responses from the node 506, e.g., batch packets of responses.

Upon receiving the plurality of responses, in one approach, the node 504 may collect the plurality of responses into an intermediate response queue. Such responses may additionally and/or alternatively be assigned to an eliciting command as a response body. For example, in one approach, the data structure holding the command and a response body associated with the command may include a command struct, e.g., see Command struct of FIG. 4.

Operation 534 of method 500 includes comparing, by the node 504, each of the responses against the certificates of the test case blocks. In some approaches, a test result may be generated by the node 504 based on the comparisons, e.g., see operation 536.

In some approaches, the comparing of operation 534 is performed in response to a determination that all the responses from the node 506 have been collected for both commands and error injections. In another approach, operation 534 is performed in response to a timer expiring. In yet another approach, the comparing of operation 534 may include the executor of the node 504 marking the test block done and instructing a validator of the node 504 to validate at least some of the responses. Various approaches described below offer illustrative examples of such comparing. It may be noted that the comparing preferably filters the plurality of responses to define a subset thereof according to definitions in certificates of the TCDF. Accordingly, at least some of the plurality of responses, e.g., responses that are not defined of the defined subset of responses, may not validated, which enables a reduction of computer processing performed when testing a system under test. Note that such filtering according to certificates prior to validation of response has heretofore not been considered in conventional testing of a system under test. In sharp contrast, during conventional protocol testing, filtering is not performed on responses received from a system under test. Accordingly, the inventive discoveries disclosed herein with regards to use of certificates for defining a subset of a plurality of received responses before validation of such responses proceed contrary to conventional wisdom.

In some approaches, comparing each of the responses against the certificates of the test case blocks may include the validator of the node 504 applying all the certificates defined in the TCDF. For example, in some approaches, a first of the test case blocks may include a first type of certificate that is configured to verify a single command of the first test case block, e.g., a single type certificate having a target for evaluation that occurs on one single addressable entity and/or property. In one or more of such approaches, comparing each of the responses against the first type of certificate may include applying a selector defined in the first type of certificate to the plurality of responses. The selector may include one or more filter parameters for defining a subset of the plurality of responses, e.g., a subset of the plurality of responses for validating. Moreover, comparing each of the responses against the first type of certificate may additionally and/or alternatively include applying each response of the subset of the plurality of responses to a single element under testing. For example, in one illustrative approach, the single element under testing may include a comparison for determining whether a response includes an addressable entity and/or property. In such an approach, the addressable entity may include an addressable variable specified in the TCDF. Here, for each response of the subset of the plurality of responses, a validity is determined by applying each of the one or more filter parameters. Based on the example above, as a result of applying the filter parameters, a subset of the plurality of responses may be defined that each include the addressable entity and/or property.

As indicated in operation 536 of method 500, results determined during validation may be incorporated into a test result. For example, in some approaches, generating the test result based on the comparisons may include adding an entry to the test result that indicates that a response of the subset of the plurality of responses is valid in response to a determination that the response of the subset of the plurality of responses satisfies the single element under testing. In contrast, an entry may be added to the test result that indicates that a response of the subset of the plurality of responses is invalid in response to a determination that the response of the subset of the plurality of responses does not satisfy the single element under testing.

In some other approaches, one of the test case blocks may include a second type of certificate that is configured to verify a plurality of commands of the first test case block. For example, in some approaches the second type of a certificate may be defined as a group certificate. In such approaches the target for evaluation may occur on entities and/or properties selected according to filters defined in the TCDF. In one or more of such approaches, comparing each of the responses against the second type of certificate may include applying a selector defined in the second type of certificate to the plurality of responses. The selector may in some approaches include one or more predefined filter parameters for defining a subset of the plurality of responses. Accordingly, in such approaches each response of the subset of the plurality of responses may meet each of the one or more filter parameters for defining the subset of the plurality of responses. The filter parameters may include any one or more known type of filter parameters. Various non-limiting examples of the filter parameters include, e.g., a timestamp, an addressable data element that includes a request frame (the timestamp when a request is sent is used as a value) of at least one of the plurality of commands of the first test case block, a response frame (the timestamp when the response is received is used as a value) of at least one of the plurality of commands of the first test case block, etc.

Subsequent to preforming the filtering, each response of the subset of the plurality of responses may be applied to a plurality of elements under testing for determining a validity of each response of the subset of the plurality of responses with respect to the second type of certificate. The elements under testing may include any one or more known type of testing elements. Various non-limiting examples of the elements under testing include, e.g., a command, a request frame of a command and a response frame of a command, identifiable addressable elements, etc.

In at least some approaches in which the type of certificate is configured to verify a plurality of commands of the first test case block, generating a test result based on the comparison may include adding an entry to the test result that indicates that a response of the subset of the plurality of responses is valid in response to a determination that the response of the subset of the plurality of responses satisfies one or more of the elements under testing. In contrast, an entry may be added to the test result that indicates that a response of the subset of the plurality of responses is invalid in response to a determination that the response of the subset of the plurality of responses does not satisfy one or more of the elements under testing.

An additional approach in which a first of the test case blocks includes a type of certificate that is configured to verify a plurality of commands of the first test case block will now be described below. In such an approach, comparing each of the responses against the certificate includes applying a selector defined in the certificate to the plurality of responses. In one example, the selector may include one or more filter parameters for defining a first subset of the plurality of responses. Moreover, a categorizer defined in the certificate may be applied to the first subset of the plurality of responses for defining a second subset of the plurality of responses. Depending on the approach, the categorizer may include one or more predefined properties for filtering the first subset of the plurality of responses to define the second subset of the plurality of responses. Each response of the second subset of the plurality of responses may be applied to a plurality of elements under testing associated with the plurality of commands for determining a validity of each response of the second subset of the plurality of responses with respect to the certificate. The predefined properties may include any known type of properties, e.g., a total number of responses in the first subset of the plurality of responses, a returned index of a response of the first subset of the plurality of responses, etc. For example, as will be described elsewhere herein, e.g., see FIG. 10B, the test results from all of the test blocks may be applied to a logical "AND" to generate the final test result for the test case. The results of determining the validity of each response of the second subset of the plurality of responses with respect to the certificate is preferably included in the test results.

Operation 536 of method 500 includes outputting the test result to the node 502. The test results are received by the node 502 in operation 538.

FIG. 6 depicts a sample of pseudocode 600 for defining a parameter set of a functional block in a TCDF, in accordance with one embodiment. As an option, the present sample of pseudocode 600 may be implemented in conjunction with features from any other embodiment listed herein, such as those described with reference to the other FIGS. Of course, however, such sample of pseudocode 600 and others presented herein may be used in various applications and/or in permutations which may or may not be specifically described in the illustrative embodiments listed herein. Further, the sample of pseudocode 600 presented herein may be used in any desired environment.

For purposes of an example, the sample of pseudocode 600 is defined according to the JSON standard, although in other approaches may be defined according to any known type of standard. The sample of pseudocode 600 includes a plurality of entries that each include a name and data type pairing.

FIG. 7A depict a sample of pseudocode 700 and FIG. 7B depicts a representation of a corresponding test case structure 720, in accordance with several embodiments. As an option, the present sample of pseudocode 700 and/or test case structure 720 may be implemented in conjunction with features from any other embodiment listed herein, such as those described with reference to the other FIGS. Of course, however, such sample of pseudocode 700 and/or test case structure 720 and others presented herein may be used in various applications and/or in permutations which may or may not be specifically described in the illustrative embodiments listed herein. Further, the sample of pseudocode 700 and/or test case structure 720 presented herein may be used in any desired environment.

The sample of pseudocode 700 of FIG. 7A includes metadata of a test case which may be defined in a TCDF. Although in the present approach pseudocode 700 pseudocode 700 is defined according to the JSON standard, test cases described herein may be defined according to any one or more known standards.

In some approaches, the fields TestCaseGeneralInformation may be translated into message printing directives directly or any encapsulated class holding those affiliated information items. TheTestCaseObject may be translated into an instance of a test class so that all the following parameters will be translated and generated. Moreover, in one approach, AffiliatedTestBlocks and following each individual TestCaseBlock-<number> may be translated into executable directives according to the specification of a selected programming language. In another approach, AffilicatedTestBlocks may be created as a list, e.g., an array in C++, a list in PYTHON, etc. Note that the whole definition of a test case is preferably fully converted to the programming languages without ambiguity.

Referring now to FIG. 7B, in one approach the test case structure 720 corresponds to the sample of pseudocode 700. The test case structure 720 is shown to include a plurality of defined information, e.g., Parameters of the test case, Preparation Steps, Test Case Block-1, Test Case Block-2, Tearing Down Environment, Etc.

Figures 8B, 9:
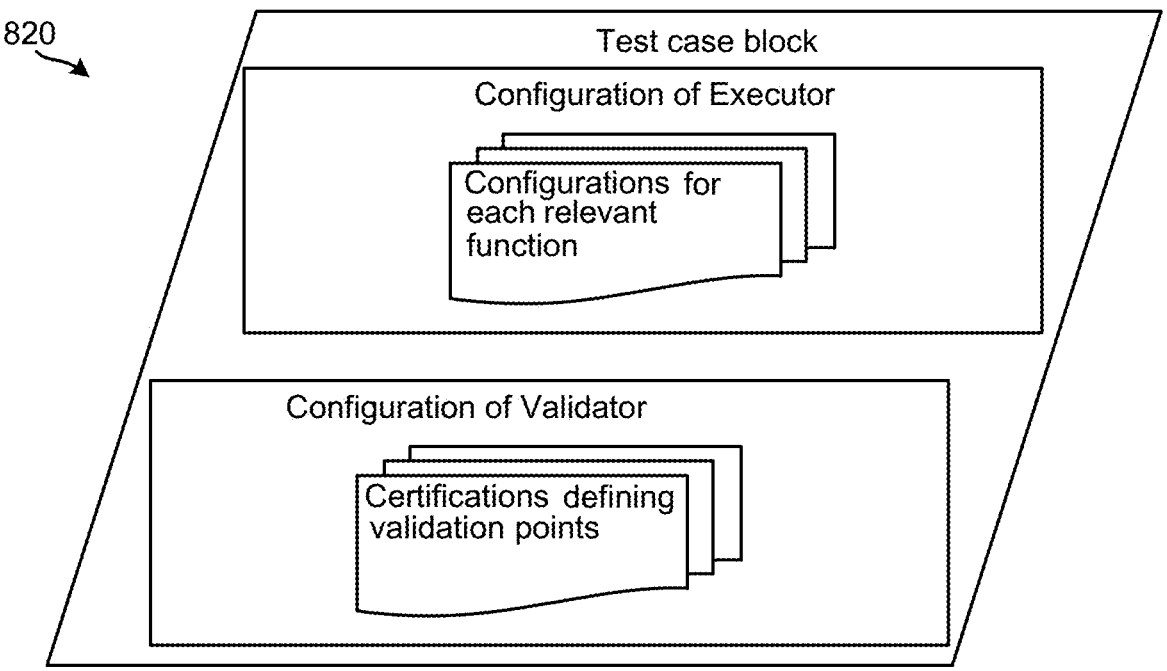
FIG. 8B is an overview of a representation of test case block that corresponds to the sample of pseudocode of FIG. 8A.
FIG. 9 is a sample of pseudocode, in accordance with one embodiment.

FIG. 8A depicts a sample of pseudocode 800 for defining an independent test block of a TCDF while and FIG. 8B depicts a representation of a corresponding test case block 820, in accordance with several embodiments. As an option, the present sample of pseudocode 800 and/or the representation of the test case block 820 may be implemented in conjunction with features from any other embodiment listed herein, such as those described with reference to the other FIGS. Of course, however, such sample of pseudocode 800 and/or the representation of the test case block 820 and others presented herein may be used in various applications and/or in permutations which may or may not be specifically described in the illustrative embodiments listed herein. Further, the sample of pseudocode 800 and/or the representation of the test case block 820 presented herein may be used in any desired environment.

Referring first to FIG. 8A, for purposes of an example, the sample of pseudocode 800 is defined according to the JSON standard, although in other approaches may be defined according to any known type of standard. The sample of pseudocode 800 includes a plurality of defined parameters 802, each associated with a different function residing on a protocol server. Moreover, in the current approach, the sample of pseudocode 800 includes background commands to run 804 for application of an associated test case block.

FIG. 9 depicts a sample of pseudocode 900 for defining error injection operations in the source code file, in accordance with one embodiment. As an option, the present sample of pseudocode 900 may be implemented in conjunction with features from any other embodiment listed herein, such as those described with reference to the other FIGS. Of course, however, such sample of pseudocode 900 and others presented herein may be used in various applications and/or in permutations which may or may not be specifically described in the illustrative embodiments listed herein. Further, the sample of pseudocode 900 presented herein may be used in any desired environment.

A portion 902 of the sample of pseudocode 900 preferably includes a name to enable events, e.g., request, response, point of time, etc., to be correctly referred and addressed in a data structure. The sample of pseudocode 900 may additionally and/or alternatively include a value 904 which may be any value supported by a protocol server to generate and later apply to test. For example, in one approach, a predefined command and customized commands which are understood by a protocol server may be included in the sample of pseudocode 900.

A target command to trigger error injection may additionally and/or alternatively be defined in the sample of pseudocode 900 in some approaches, e.g., see portion 906. In some approaches, the field may be implemented as a filter. For example, in one approach, fibre channel filtering may include, e.g., a command with Data IO(read, write), a command with Data IO out(write), a command with Data IO in(read), a command without Data IO(TUR), etc.

A portion 908 of the sample of pseudocode 900 additionally includes a parameter set, which may be in a similar format as defined in an associated parameter, e.g., see FIG. 6. The portion 908 may be used by a protocol server to generate error injection operations and apply a test on a system under test.

FIGS. 10A-10C depict portions of a sample of pseudocode 1000 for defining a certificate of a test case block in a TCDF, in accordance with one embodiment. As an option, the present sample of pseudocode 1000 may be implemented in conjunction with features from any other embodiment listed herein, such as those described with reference to the other FIGS. Of course, however, such sample of pseudocode 1000 and others presented herein may be used in various applications and/or in permutations which may or may not be specifically described in the illustrative embodiments listed herein. Further, the sample of pseudocode 1000 presented herein may be used in any desired environment.

For purposes of an example, the sample of pseudocode 1000 is defined according to the JSON standard, although in other approaches may be defined according to any known type of standard.

The sample of pseudocode 1000 may in some approaches include a field, e.g., see "type" for defining whether a certificate is to verify one command, e.g., see "Single", or a group of commands, e.g., see "Group". For example, referring now to FIG. 10A, the sample of pseudocode 1000 includes a type defined to "Single". In such an example, the field "target" is preferably defined to an addressable variable in a TCDF that includes the sample of pseudocode 1000. Portion 1002 of the sample of pseudocode 1000 may be used to flag that the certificate is configured for a single command/frame among those in "BackgroundCommandsTo-Run". In one approach, portion 1004 includes a response that refers to an immediate response received from a SUT after the error injection is triggered. In some approaches the term "request" may be used to address and/or access the error injection itself. In the current approach portion 1006 defined as a list of lists. More specifically, the revelation between embedded lists includes a logical "OR" which may translate to a success validation of any list will result in a final pass for this certificate. Moreover, within each list, a logical "AND" may be applied. In other words, in some approaches, a pass of the certificate of FIG. 10A may require that all the properties pass comparisons associated therewith.

In contrast, in one or more approaches in which the "type" is defined to "Group", a certificate may be defined to verify a group of commands. In this case, instead of being defined as direct addressable variable, the field, e.g., "target", may be defined by a "selector", which further defines "filters". Field "filters" is defined as a list of lists, the relation among embedded lists is logical "OR", meaning that results will be combined/aggregated after applying all the define filters. As will be described in greater detail elsewhere herein, within each list (filter), logical "AND" will apply, meaning that the result will be the intersection after applying all the defined filters within the list, e.g., see FIG. 10C.

Portion 1008 of the sample of pseudocode 1000 represents an available addressable variable that can be applied according to one or more actions defined in the sample of pseudocode 1000.

One or more comparison operations, e.g., =, <, >, >=, <=, < >(!=), etc., may be defined in portion 1010 as filter parameters. Such comparison operations may optionally be combined with operations of portion 1012 for validating the value received for "name" in a "response" of "Error-Injection-1". Note that depending on the approach, multiple properties may be optionally be defined for each "addressableUnit", e.g., see portion 1014.

Also note that field "addressableUnits" may define a group of addressable units, with each defined as either "request" or "response" of the "target" defined earlier. For each addressable unit, multiple properties may be defined as validation points to apply comparison operations defined therein. For purposes of an example, an illustrative representation of a structure of addressableUnits is defined elsewhere herein, e.g., see FIG. 12.

In some approaches, under "type"-"Group" certificate category, "addressableUnits" may support, e.g., "request", "response", "responses", etc. A "response"-"type" validation may be applied upon each of the results selected by "target". For example, assuming that there are ten responses selected by the "filters" defined in "target", a validation of this type preferably applies defined "validations" on the group. Here the group may include a list, e.g., an array, of responses. Moreover, here the definitions in "addressable-Units" is shared by all the targets selected by "selector". For example, an "addressableUnit", defined in the pseudocode 1000 of FIG. 10B may in one approach infer that each selected target is to have a property structure similar to and/or matching a predefined definition, e.g., such as target.response.status.

In FIG. 10B, "property" in each validation may be further defined as a filter unit. The sample of pseudocode 1000 includes a function to be applied before a validation action is performed, e.g., see portion 1016. Moreover, portion 1018 includes comparison operations, e.g., =, <, >, >=, <=, < >(!=), etc. The comparison operations may be combined with one or more other operations to filter out targets to be evaluated and validated, e.g., see portion 1020. Note that multiple addressable units may optionally be defined for each error injection, e.g., see portion 1022.

The definition in "property" may in some approaches be regarded as categorizer which may optionally be utilized for further filtering upon results being returned from "selector" in "target", e.g., upon defining a subset of a plurality of responses received from a SUT. The characteristics, which may additionally be named as inferred properties. In one approach one such characteristic may include a total, e.g., the total number of responses in the returned result by "selector" in "target". In another approach, characteristic may include an index-of, e.g., return the index of the interested response, which is identified by "property", in reference to the list of the responses selected by "selector" in "target". Note that in some approaches, the characterization function may be implemented in "before". This means that in the current approach, the designated function is called before the validation action is applied.

The sample of pseudocode 1000 in FIG. 10C is similar to the definitions in the certificate defined for "Error-Injection-1". For example, portion 1024 of the sample of pseudocode 1000 may be used to flag that the certificate is configured for a single command and/or frame. A selector, e.g., see portion 1026, may be utilized to select a group of targets so that a validation process performed thereafter may apply a defined "addressableUnits" to verify each affiliated property.

Filters of portion 1028 may be defined as a list of lists, similar to "validations" in "addressableUnits". Revelations among such lists may in some approaches include a logical "OR" comparison, e.g., see [ ] of 1036. In some approaches there may be one or more logical "AND" comparisons included within one or more of the embedded lists, e.g., see { } of 1038.

Portion 1030 defines a property from the available targets to be applied with the filter. For example, such properties may include, e.g., a command name (TUR, read, write etc.), command type (command, command with data I/O etc.), any addressable structures defined in available targets such as payload size, etc. Moreover, portion 1032 defines comparison operations, e.g., =, <, >, >=, <=, < >(!=), which may be combined with operations of portion 1034 for filtering out targets to be evaluated and validated, e.g., defining a subset of a plurality of received responses for validating.

As indicated elsewhere above, in some approaches, multiple "AND" filters and/or multiple "OR" filters may be defined, e.g., see portions 1036 and 1038 respectively.

In some approaches the sample of pseudocode 1000 may define a time window, e.g., see "timeWindow". The "time-Window" field may define a time window that is to be filtered against. According to some approaches, values for "start" and "end" may include a timestamp or an addressable data element. In some approaches, the request frame of a command (the timestamp when the request is sent is used as a value) or a response frame of a command (the timestamp when the response is received is used as a value) may be used as such values. For example, portion 1040 defines that the time a time window begin upon the request of "Error-Injection-1" is sent. A time window may define a period for a system under test to obtain responses to commands of the pseudocode 1000. In portion 1042, the time window is defined to end in response to a determination that a response of "Error-Injection-2" is received.

A portion of the sample of pseudocode 1000 may include a definition to flag that this is a certificate for a group of commands and/or frames among those in "Background-CommandsToRun", e.g., see portion 1044. Portion 1046 is similar to the definition for the type-Single certificate.

Figure 11:
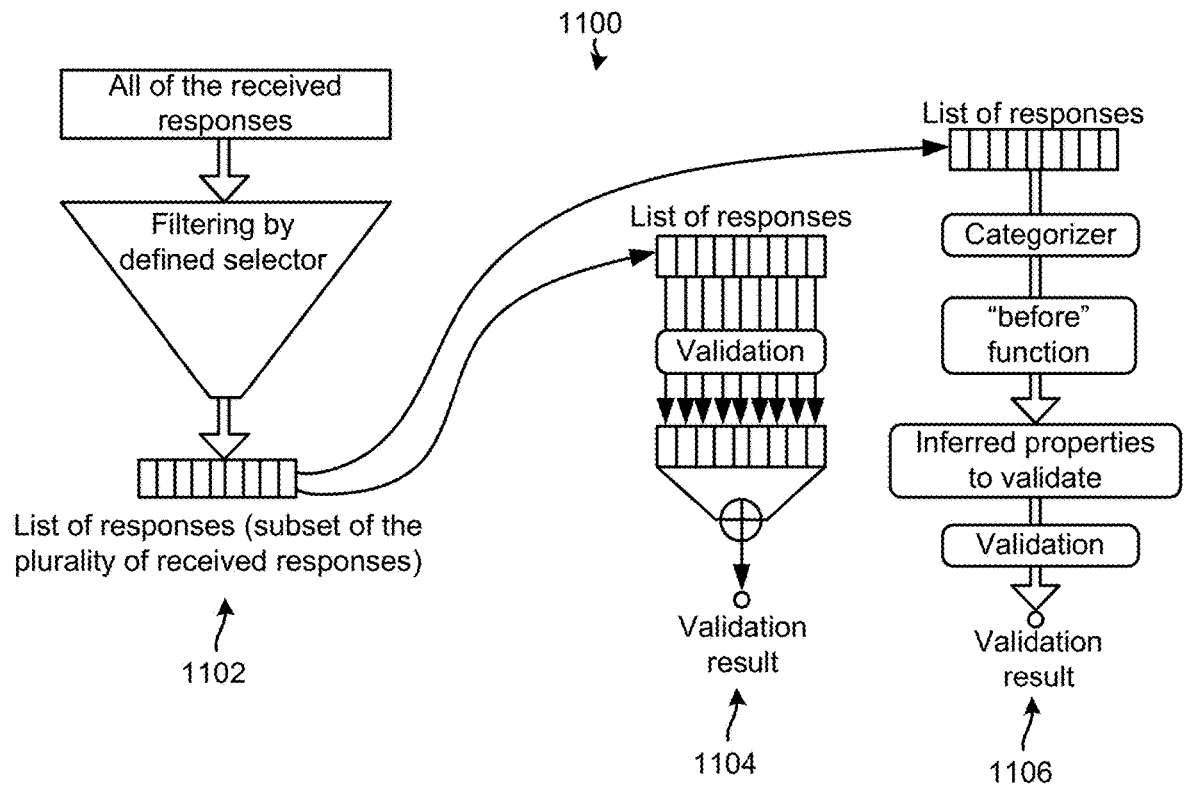
FIG. 11 is an overview of a logical process of validating responses received from a SUT, in accordance with one embodiment.

FIG. 11 depicts a logical representation 1100 of a process of validating responses received from a SUT, in accordance with one embodiment. As an option, the present logical representation 1100 may be implemented in conjunction with features from any other embodiment listed herein, such as those described with reference to the other FIGS. Of course, however, such logical representation 1100 and others presented herein may be used in various applications and/or in permutations which may or may not be specifically described in the illustrative embodiments listed herein. Further, the logical representation 1100 presented herein may be used in any desired environment.

A first portion 1102 of logical representation 1100 depicts a process in which responses received from a SUT, e.g., All of the received responses, are filtered by a selector defined in a TCDF. In some approaches, the filtering action may be implemented on a test client by firstly copy a list of command structs to local. In another approach, the filtering may occur on a protocol server directly. The filtering directives having definitions included in the definition of the certificate, may be mapped to a filtering function where one or more filtering actions are performed.

A list of responses, e.g., a subset of the plurality of received responses are determined based on the filtering. In one approach, the list of responses may be validated as "type"-"responses."

For example, in portion 1104 of logical representation 1100, the list of responses are applied to a single element under testing, e.g., validation points. For example, the single element under testing may include a comparison for determining whether a response includes an addressable entity and/or property, e.g., an addressable variable specified in the TCDF.

In contrast, portion 1106 of logical representation 1100 includes a logical representation of a process of validating "type"-"responses" validation points, in which validations are applied to grouped responses.

A validator may be utilized to apply one or more defined comparisons upon targets being selected by the filtering. In some approaches the validator may additionally be used for concluding the test result, e.g., determining whether a given response of a subset of the received responses is valid. Moreover, in some approaches, a test client may run each test block one by one. In one or more of such approaches, this may include performing operations 518 and/or 534 of method 500. The test results from all of the test blocks may be applied to a logical "AND" to generate the final test result for the test case.

Figure 12:
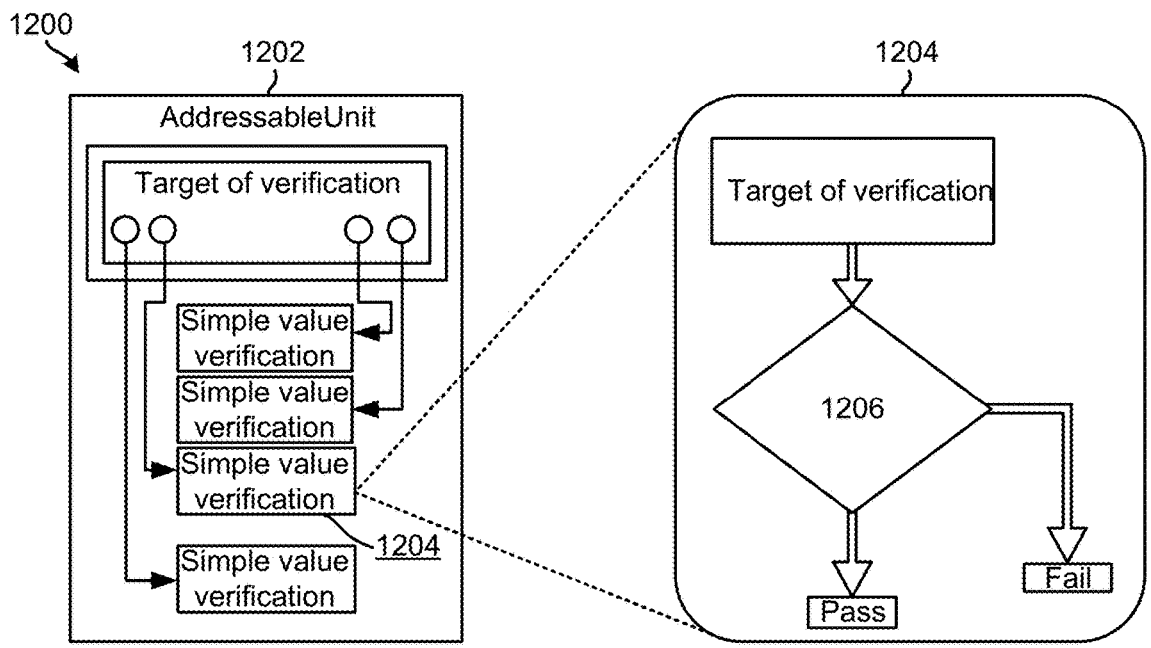
FIG. 12 is an overview of a logical process of comparing each of a plurality of responses against certificates of a test case block, in accordance with one embodiment.

FIG. 12 depicts a logical representation 1200 of a process of comparing each of the responses against certificates of a test case block, in accordance with one embodiment. As an option, the present logical representation 1200 may be implemented in conjunction with features from any other embodiment listed herein, such as those described with reference to the other FIGS. Of course, however, such logical representation 1200 and others presented herein may be used in various applications and/or in permutations which may or may not be specifically described in the illustrative embodiments listed herein. Further, the logical representation 1200 presented herein may be used in any desired environment.

Representation 1200 depicts an embodiment in which a comparing of one or more responses against a certificate that includes a first of the test case blocks of a TCDF. The certificate is configured to verify a single command of the first test case block. In one approach, the verifying includes applying responses to a single element under testing. For example, verification using a single element under testing includes determining whether a response includes a target of verification, e.g., see structure 1202. For example, decision 1206 illustrates a determination as to whether a response includes a target of verification 1204. In decision 1206 an operation specified in the TCDF may be applied to a property to verify of the target of verification 1204. In response to a determination that the property to verify does not satisfy the operation, e.g., the received value does not match a value specified in the TCDF, it may be determined that the target of verification 1204 is invalid, e.g., see Fail. In contrast, in response to a determination that the property to verify satisfies the operation, e.g., the received value matches a value specified in the TCDF, it may be determined that the target of verification 1204 is valid, e.g., see Pass. Such determinations may be included in a generated test result.

Figure 13A:
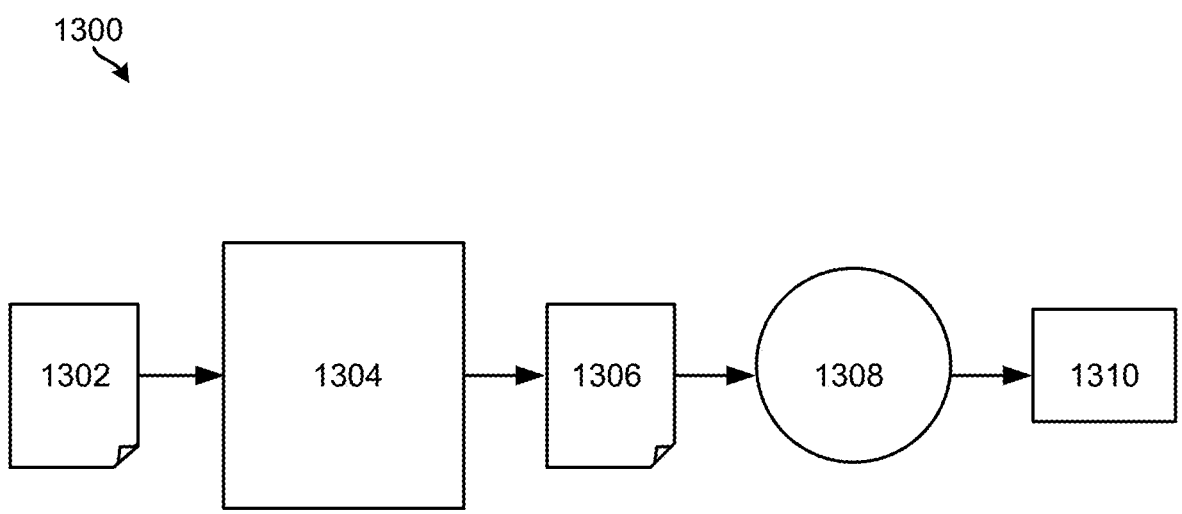
FIG. 13A is a logical representation of generation and compilation of test cases of a TCDF, in accordance with one embodiment.
Figure 13B:
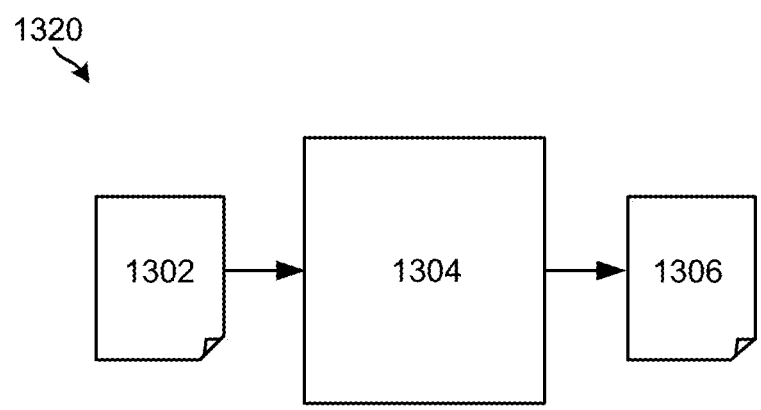
FIG. 13B is a logical representation of generation of test cases of a TCDF, in accordance with one embodiment.

FIGS. 13A-13B depict representations 1300, 1320 which logically depict generation and compiling of test cases of a TCDF, in accordance with various embodiments. As an option, the present representations 1300, 1320 may be implemented in conjunction with features from any other embodiment listed herein, such as those described with reference to the other FIGS. Of course, however, such representations 1300, 1320 and others presented herein may be used in various applications and/or in permutations which may or may not be specifically described in the illustrative embodiments listed herein. Further, the representations 1300, 1320 presented herein may be used in any desired environment.

Referring first to FIG. 13A, representation 1300 illustrates an illustrative process for generating and compiling test cases that are written in C++ or other similar programming languages. For example, in some approaches, a TCDF 1302 may be input to a known type of test case generator 1304. A resulting test case 1306 may thereafter be input to a compiler 1308. Source code files 1310 resulting from the compiling may thereafter be executed directly.

In contrast, referring first to FIG. 13B, representation 1320 illustrates an illustrative process for generating test cases that are written in PYTHON or other similar programming languages. It may be noted that the process of representation 1320 is similar to the process of the process of representation 1300, although the process of representation 1320 may not utilize compiling of source code files. Instead, in representation 1320 upon generating the test case file 1306, a test client application and protocol server application may be executed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a protocol server, a source code file configured to be executed by a node, wherein the source code file includes a test case definition file (TCDF),
wherein the TCDF includes parameters for a test case, preparation steps related to the test case, and a plurality of test case blocks,
wherein each test case block of the plurality of test case blocks includes: a set of testing steps and a certificate defining a validity of potential responses of performing the testing steps;
outputting, by the protocol server to a system under test (SUT), the source code file with an instruction for a node of the SUT to execute the source code file in order to implement the set of testing steps for each of the plurality of test case blocks;
receiving, by the protocol server from the SUT, a plurality of responses;
defining a subset of the plurality of responses thereby reducing an amount of processing that is performed during determinations of validity of the received responses;
determining a validity of each response in the subset, wherein determining the validity includes comparing, by the protocol server, the responses in the subset against the certificates of the test case blocks; and
generating, by the protocol server, a test result based on the comparisons.

2. The computer-implemented method of claim 1,
wherein a first of the test case blocks includes a first type of certificate that is configured to verify a single command of the first test case block,
wherein defining the subset of the plurality of responses includes:

applying a selector defined in the first type of certificate to the plurality of responses, wherein the selector includes one or more filter parameters for defining the subset of the plurality of responses,
wherein comparing each of the responses in the subset against the certificates of the test case blocks includes:
applying each response of the subset of the plurality of responses to a single element under testing for determining a validity of each response of the subset of the plurality of responses with respect to the first type of certificate.

3. The computer-implemented method of claim 2,
wherein the single element under testing is a comparison for determining whether a response includes an addressable entity,
wherein the addressable entity includes an addressable variable specified in the TCDF.

4. The computer-implemented method of claim 1,
wherein a first of the test case blocks includes a first type of certificate that is configured to verify a plurality of commands of the first test case block,
wherein defining the subset of the plurality of responses includes:
applying a selector defined in the first type of certificate to the plurality of responses, wherein the selector includes one or more predefined filter parameters for defining the subset of the plurality of responses,
wherein comparing each of the responses in the subset against the certificates of the test case blocks includes:
applying each response of the subset of the plurality of responses to a plurality of elements under testing for determining a validity of each response of the subset of the plurality of responses with respect to the first type of certificate.

5. The computer-implemented method of claim 4, wherein the elements under testing are selected from the group consisting of: a command, a request frame of a command, and a response frame of a command.

6. The computer-implemented method of claim 4, wherein the one or more predefined filter parameters for defining the subset of the plurality of responses are selected from the group consisting of: a timestamp, an addressable data element that includes a request frame of at least one of the plurality of commands of the first test case block, and a response frame of at least one of the plurality of commands of the first test case block.

7. The computer-implemented method of claim 1,
wherein a first of the test case blocks includes a first type of certificate that is configured to verify a plurality of commands of the first test case block,
wherein defining the subset of the plurality of responses includes:
applying a selector defined in the first type of certificate to the plurality of responses, wherein the selector includes one or more filter parameters for defining a first subset of the plurality of responses, and
applying a categorizer defined in the first type of certificate to the first subset of the plurality of responses for defining a second subset of the plurality of responses, wherein the categorizer includes one or more predefined properties for filtering the first subset of the plurality of responses to define the second subset of the plurality of responses,
wherein comparing each of the responses in the subset against the certificates of the test case blocks includes:
applying each response of the second subset of the plurality of responses to a plurality of elements under testing for determining a validity of each response of the second subset of the plurality of responses with respect to the first type of certificate.

8. The computer-implemented method of claim 7, wherein the one or more predefined properties are selected from the group consisting of: a total number of responses in the first subset of the plurality of responses, and a returned index of a response of the first subset of the plurality of responses.

9. A computer program product, the computer program product comprising a computer readable storage medium having program instructions embodied therewith, the program instructions readable and/or executable by a protocol server to cause the protocol server to:
receive, by the protocol server, a source code file configured to be executed by a node, wherein the source code file includes a TCDF,
wherein the TCDF includes parameters for a test case, preparation steps related to the test case, and a plurality of test case blocks,
wherein each test case block of the plurality of test case blocks includes: a set of testing steps and a certificate defining a validity of potential responses of performing the testing steps;
output, by the protocol server to a system under test (SUT), the source code file with an instruction for a node of the SUT to execute the source code file in order to implement the set of testing steps for each of the plurality of test case blocks;
receive, by the protocol server from the SUT, a plurality of responses;
define, by the protocol server, a subset of the plurality of responses thereby reducing an amount of processing that is performed during determinations of validity of the received responses;
determine a validity of each response in the subset, wherein determining the validity includes comparing, by the protocol server, the responses in the subset against the certificates of the test case blocks; and
generate, by the protocol server, a test result based on the comparisons.

10. The computer program product of claim 9,
wherein a first of the test case blocks includes a first type of certificate that is configured to verify a single command of the first test case block,
wherein defining the subset of the plurality of responses includes:
applying a selector defined in the first type of certificate to the plurality of responses, wherein the selector includes one or more filter parameters for defining the subset of the plurality of responses,
wherein comparing each of the responses in the subset against the certificates of the test case blocks includes:
applying each response of the subset of the plurality of responses to a single element under testing for determining a validity of each response of the subset of the plurality of responses with respect to the first type of certificate.

11. The computer program product of claim 10,
wherein the single element under testing is a comparison for determining whether a response includes an addressable entity,
wherein the addressable entity includes an addressable variable specified in the TCDF.

12. The computer program product of claim 9,
wherein a first of the test case blocks includes a first type of certificate that is configured to verify a plurality of commands of the first test case block,
wherein defining the subset of the plurality of responses includes:
applying a selector defined in the first type of certificate to the plurality of responses, wherein the selector includes one or more predefined filter parameters for defining the subset of the plurality of responses,
wherein comparing each of the responses in the subset against the certificates of the test case blocks includes:
applying each response of the subset of the plurality of responses to a plurality of elements under testing for determining a validity of each response of the subset of the plurality of responses with respect to the first type of certificate.

13. The computer program product of claim 12, wherein the elements under testing are selected from the group consisting of: a command, a request frame of a command and a response frame of a command.

14. The computer program product of claim 12, wherein the one or more predefined filter parameters for defining the subset of the plurality of responses are selected from the group consisting of: a timestamp, an addressable data element that includes a request frame of at least one of the plurality of commands of the first test case block, and a response frame of at least one of the plurality of commands of the first test case block.

15. The computer program product of claim 9,
wherein a first of the test case blocks includes a first type of certificate that is configured to verify a plurality of commands of the first test case block,
wherein defining the subset of the plurality of responses includes:
applying a selector defined in the first type of certificate to the plurality of responses, wherein the selector includes one or more filter parameters for defining a first subset of the plurality of responses, and
applying a categorizer defined in the first type of certificate to the first subset of the plurality of responses for defining a second subset of the plurality of responses, wherein the categorizer includes one or more predefined properties for filtering the first subset of the plurality of responses to define the second subset of the plurality of responses,
wherein comparing each of the responses in the subset against the certificates of the test case blocks includes:
applying each response of the second subset of the plurality of responses to a plurality of elements under testing for determining a validity of each response of the second subset of the plurality of responses with respect to the first type of certificate.

16. The computer program product of claim 15, wherein the one or more predefined properties are selected from the group consisting of: a total number of responses in the first subset of the plurality of responses, and a returned index of a response of the first subset of the plurality of responses.

17. A system, comprising:
a processor; and
logic integrated with the processor, executable by the processor, or integrated with and executable by the processor, the logic being configured to cause a protocol server to:
receive a source code file configured to be executed by a node, wherein the source code file includes a TCDF,
wherein the TCDF includes parameters for a test case, preparation steps related to the test case, and a plurality of test case blocks,
wherein each test case block of the plurality of test case blocks includes: a set of testing steps and a certificate defining a validity of potential responses of performing the testing steps;
output to a system under test (SUT), the source code file with an instruction for a node of the SUT to execute the source code file in order to implement the set of testing steps for each of the plurality of test case blocks;
receive from the SUT, a plurality of responses;
define a subset of the plurality of responses thereby reducing an amount of processing that is performed during determinations of validity of the received responses;
determine a validity of each response in the subset, wherein determining the validity includes comparing the responses in the subset against the certificates of the test case blocks; and
generate a test result based on the comparisons.

18. The system of claim 17,
wherein a first of the test case blocks includes a first type of certificate that is configured to verify a single command of the first test case block,
wherein defining the subset of the plurality of responses includes:
applying a selector defined in the first type of certificate to the plurality of responses, wherein the selector includes one or more filter parameters for defining the subset of the plurality of responses,
wherein comparing each of the responses in the subset against the certificates of the test case blocks includes:
applying each response of the subset of the plurality of responses to a single element under testing for determining a validity of each response of the subset of the plurality of responses with respect to the first type of certificate.

19. The system of claim 18,
wherein the single element under testing is a comparison for determining whether a response includes an addressable entity,
wherein the addressable entity includes an addressable variable specified in the TCDF.

20. The system of claim 17,
wherein a first of the test case blocks includes a first type of certificate that is configured to verify a plurality of commands of the first test case block,
wherein defining the subset of the plurality of responses includes:
applying a selector defined in the first type of certificate to the plurality of responses, wherein the selector includes one or more predefined filter parameters for defining the subset of the plurality of responses,
wherein comparing each of the responses in the subset against the certificates of the test case blocks includes:
applying each response of the subset of the plurality of responses to a plurality of elements under testing for determining a validity of each response of the subset of the plurality of responses with respect to the first type of certificate.

* * * * *